United States Patent [19]

Wang

[11] 4,366,889

[45] Jan. 4, 1983

[54] AUTOMATICALLY AND MANUALLY OPERABLE GEAR SHIFTER

[76] Inventor: Ching C. Wang, No. 19, La. 238, Sec. 1, Mucha Rd., Tapei 116, Taiwan

[21] Appl. No.: 177,429

[22] Filed: Aug. 12, 1980

[51] Int. Cl.³ .............................................. B60K 41/28
[52] U.S. Cl. ................................ 192/0.092; 192/3.58; 192/3.59; 192/3.62; 192/103 R; 74/866
[58] Field of Search .................... 192/3.59, 3.58, 3.57, 192/0.033, 103 R, 3.61, 3.62, 0.092; 74/866

[56] References Cited

U.S. PATENT DOCUMENTS

| | | | |
|---|---|---|---|
| 2,302,005 | 11/1942 | Caves | 192/0.033 X |
| 3,089,571 | 5/1963 | Schick | 192/3.59 |
| 3,298,483 | 1/1967 | Morrison | 192/3.58 |
| 3,628,642 | 12/1971 | Ravenel | 192/3.58 |
| 3,631,946 | 1/1971 | Grosseau | 192/3.58 |
| 3,667,577 | 6/1972 | Weymann | 192/3.58 X |
| 3,684,071 | 8/1972 | Weymann | 192/3.59 |
| 4,294,341 | 10/1981 | Swart | 192/0.092 |

Primary Examiner—George H. Krizmanich
Attorney, Agent, or Firm—Cushman, Darby & Cushman

[57] ABSTRACT

A gear shift arrangement operable either in manually or automatically. In automatic operation a control brain determiners vehicle speed and operates various cylinders for automatically declutching and shifting gears.

16 Claims, 10 Drawing Figures

AUTOMATICALLY AND MANUALLY OPERABLE GEAR SHIFTER

This invention relates to automobile gear shift systems which can be operated both manually and automatically.

All the automatic shifters of the no clutch type are using a pump and a turbine as a substitute for the clutch. The structure of this kind of shifter is very complicated. Besides, to compare with the hand operating shifter, the automatic shifter of the no clutch type will consume 15% more fuel oil than the clutch type shifter. Further more, the automatic shifter of the no clutch type must include a radiator. If the electric capacity of the battery is not enough for the car to start, the car can't be started by pushing it forward. Other, in driving, the driver still has to operate a control lever. When the automatic shifter is out of order, there is no way to operate the shifter by hand.

It is an object of the invention to provide a gear shift system which can be operated either by hand or automatically, and which does not have the operational disadvantages associated with known automatic gear shifters as mentioned above.

According to the invention, the car still has a clutch. Therefore, this system comprises two parts: one is automatic shifter, another is hand shifter. If the part of automatic shifter is out of order, the car still can be driven by hand. This is the another object of the invention.

Because there is still a clutch in the system of the invention, the output power from the engine will be transmitted completely to the wheel. The position of the gear shifting lever is controlled by a control brain, at any speed, this position will be in the right position equivalent to the speed of the car. This is also an object of the invention.

The invention will be described with reference to the drawings, wherein

Figure 1:
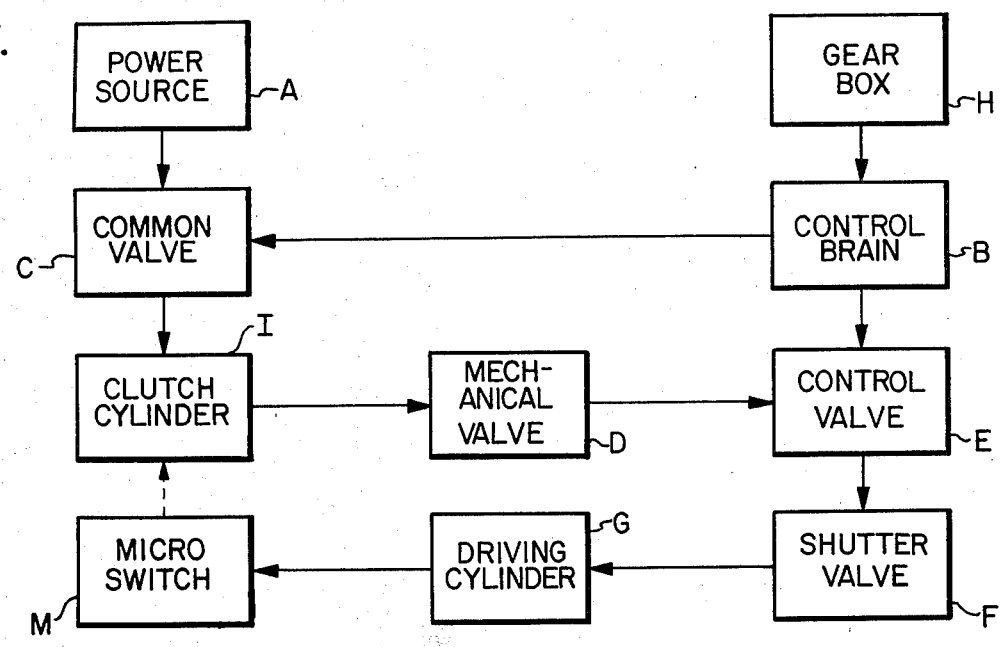
FIG. 1 is a functional block diagram of the system.

With reference to FIG. 1, the gear shifting system of the present invention comprises mainly a power source A, a control brain B, a common valve C, a mechanical valve D, one set of control valve E, one set of shutter valve F, a pair of micro-switch M, and one set of driving cylinder G. Power generated by power source A will be transmitted by a transmission element to the common valve C. Because the common valve C is first driven to open by control brain B, the power then passes through the common valve C and going into the clutch operating cylinder I to pull the clutch separate from the power shaft. The clutch lever then presses the mechanic valve D and opens it. The power then transmites to the control valve E. Because the output of gear box H can transmit the speed of the wheel to the control brain B. The control brain B will drive a valve of the control valve E open, then, the power will pass the valve of the control valve E to drive the shutter valve F open. After the shutter valve F opens, power then goes into the cylinder G. The cylinder G then drive gear shifting lever shake right or left, forward or backward. At last, the gear shifting lever will set into the right position, which is equivalent to the speed of the car. After that, because of the effect by the switch M beside the gear shift lever, the cylinder G then loses the power, the mechanic element on the clutch, such as, spring etc. operates to pull the clutch back into the position contacted with the shaft of gear box. The motion of the gear shifting then completed.

If the automatic gear shifter is out of order, cut off the power source A. Then the car will be driven by hand and foot, as the general hand operating shifter is done.

Because the power source, the control brain . . . etc. can be different. Therefore, there are many practical examples about the invention. Some are given in follows for illustration:

EXAMPLE 1

This example includes an electric control brain, and utilizes compressed air as the power to drive the electro-magnetic valve . . . etc. operate, then the clutch and gear shifter can be moved automatically or passively.

Figure 2:
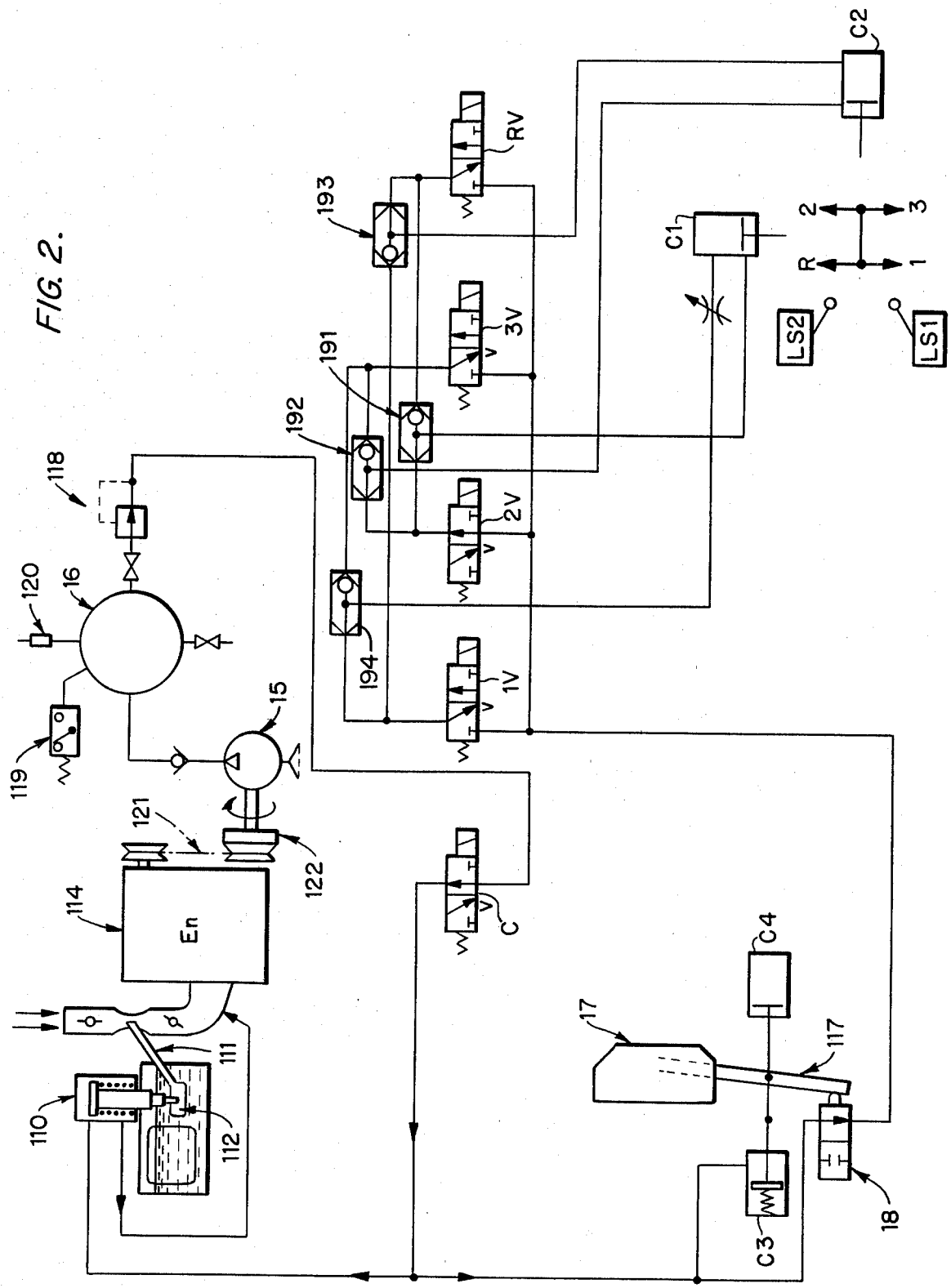
FIG. 2 is a practical embodiment of the mechanic system of the invention.

With reference to FIG. 2, the mechanic system comprises an air compressor 15, which can produce compressed air. The air compressor is coupled to the engine 114 by an electro-magnetic linkage 122 and belt 121. Thus, the air compressor will be driven to operate, and the produced compressed air will be stored in air tank 16. By the side of the tank 16, there are a pressure switch 119 and a safty valve 120. When the pressure of the air tank reaches an upper limit, the pressure switch 119 will be driven on. Then the electro-magnetic linkage 122 will be separated and the air compressor will stop. When the pressure 16 in the air tank falls below a lower limit, the pressure switch 119 causes the electro-magnetic linkage 122 to make contact automatically, causing the air compressor to start to work. On the air pipe which is leading out from the air tank 16, there is placed an adjusting valve 18, which can adjust and maintain the pressure of the compressed air in the pipe. The air pipe from the air tank 16 first links to the common valve CV, then splits into two branches, one branch directs to a vacuum piston 110, the other directs to an air cylinder $C_3$. If the common valve CV is opened, the compressed air will flow to air cylinder $C_3$, the air cylinder $C_3$ then pulls the clutch separate from the power shaft. If the clutch is opened, the clutch lever 17 presses the mechanic valve 18 open, the compressed air then flows to the electro magnetic control valve set 1V, 2V, 3V, RV. These valves belong to the low speed, intermediate speed, high speed and reverse respectively and correspond to control valve E in FIG. 1. The air passed the valve will then flow through the shutter valve 191, 192, 193, 194 (these valves correspond to shutter valve F shown in FIG. 1); to drive the air cylinder $C_1$, $C_2$ operate. That is, cylinder $C_1$ will make the gear shifting lever shake forward and backward, cylinder $C_2$ make the gear shifting lever shake right and left. And at least, the gear shifting lever will shake into the right position, which is equivalent to the speed of the car. Cylinders $C_1$ and $C_2$ correspond to driving cylinder 6 shown in FIG. 1.

In FIG. 2, we can see that if the mechanic valve 18 is open, the compressed air then flows pass the intermediate valve 2V, after the air flowed through the shutter valve 191, 192, the cylinder $C_2$ first pull the gear shifting lever to right, then cylinder $C_1$ again push the gear shifting lever forward into position 2, which is the position of intermediate speed. Meanwhile, the switch $LS_2$ off (LS1 and LS2 correspond to microswitch M shown in FIG. 1), the electro-magnetic valve CV, 2V shut, and the air flows out of the pipe. The air cylinder $C_3$ then loses the compressed air, the clutch 17 is pulled back to its original position by a spring. Thus, the power from the engine transmites to the intermediate gear of the gear box. The gear shifting then is completed.

If the clutch is pulled separated from the power shaft, the engine 14 is unloaded. To avoid the no load speed over the limit, the another pipe is coupled to a vacuum piston 110, which can press down the needle of the oil gauge 112, then decrease the oil consumption.

Figure 5:
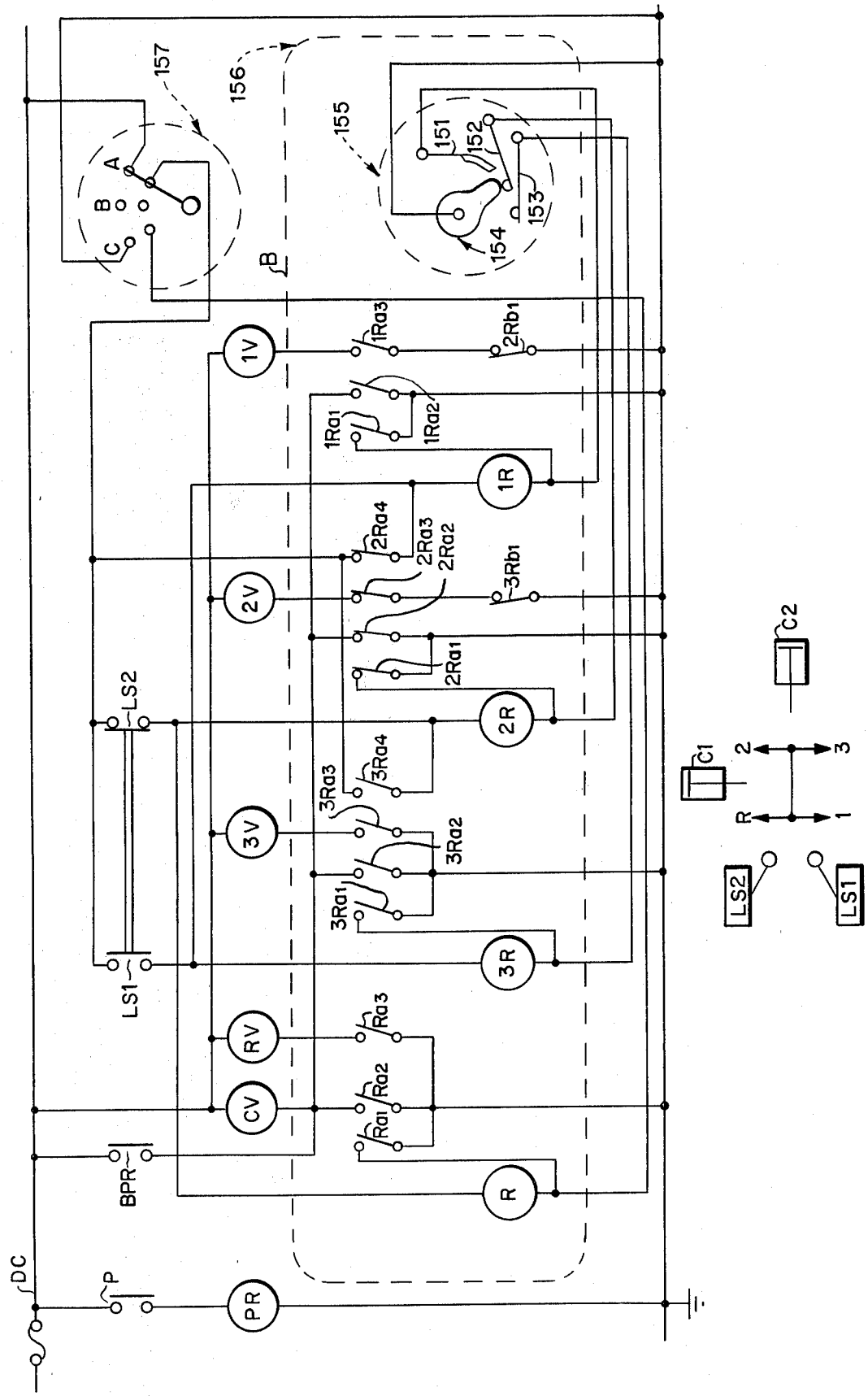
FIG. 5 is a schematic diagram of the electric circuit used in the embodiments of FIG. 2, FIG. 3 and FIG. 4 of the invention.

In reverse circumstance, the electric switch 157 of FIG. 5 must operate to position "C", then, the common valve CV and back valve RV open simultaneously by the same process shown above, the gear shifting lever will shake into the reverse position "R", which can be sight from FIG. 2.

With reference to FIG. 5, which shows the electric circuit used in example 1, which comprises a control switch 157, the control switch has three pairs of contact points. Where in, A is the pair of contact points for automatic operation, B is the pair of contact points for hand operation, C is the pair of contact points for reverse. In this electric circuit, there is a control brain (corresponding to control brain B shown in FIG. 1), which comprises mainly an induction disk 155, and one set of relay 1R, 2R, 3R, RE. In the induction disk, there are a contact needle 154 and three pairs of contact points 151, 152, 153, the electric line lead out from the points is contacted to the relay of each speed respectively, the contact points of every relay are contacted to the electro-magnetic valve 1V, 2V, 3V, RV, CV shown in FIG. 2. Besides, the reverse relay RE and the intermediate speed relay 2R both are controlled by time limit switch $LS_2$. The low speed relay 1R and high speed relay 3R are then controlled by another time limit switch $LS_2$.

When the electric circuit is in automatic gear shifting circumstance as shown in FIG. 5, the control switch 157 must be turned to the pair of contact point A. Then, if the needle in the induction disk 155 is turned to intermediate points 152, the current will flow to relay 2R, the contact points $2Ra_1$, $2Ra_2$, $2Ra_3$, $2Ra_4$ on, the common valve CV and intermediate speed electro-magnetic valve 2V open. The air cylinder $C_1$ and $C_2$ shown in FIG. 2 are driven by compressed air, and the gear shifting lever is shaken to position 2. On this minute, time limit switch $LS_2$ open, the intermediate speed relay 2R off, whose contact points $2Ra_2$, $2Ra_3$ open, no current flow in the common valve CV and the intermediate speed valve 2V. The gear shifting is then finished.

The operation of gear shifting for low speed and high speed are substantially the same as the gear shift operation for intermediate speed and therefore they will not be described in detail.

In FIG. 5, if the control switch is turned to the reverse position C, the reverse relay RE works, whose points $Ra_1$, $Ra_2$, $Ra_3$ contact. The common electro-magnetic valve CV and reverse electro magnetic valve open. The gear shifting lever then shift to position R (shown in the right lower corner of FIG. 2), the time limit switch $LS_2$ off, the reverse relay RE opened, whose contact points jump open, the common electromagnetic valve CV, reverse electro magnetic valve RV stop working, the reverse gear shifting is finished.

EXAMPLE 2

Figure 3:
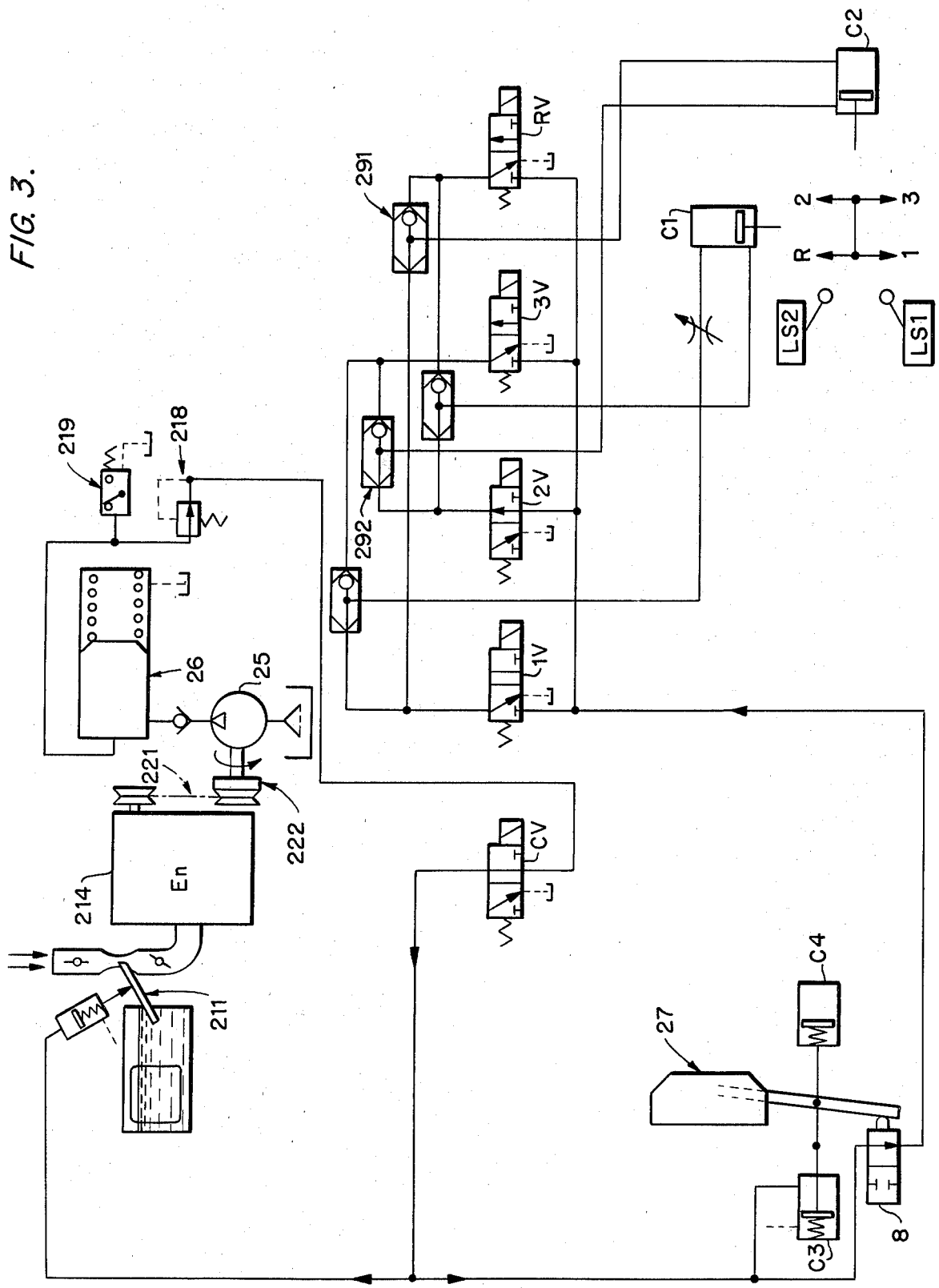
FIG. 3 is a practical embodiment of the hydraulic system of the invention.

With reference to FIG. 3, in which the air compressor 15 in FIG. 2 is substituted by oil pump 25, the air tank 16 in FIG. 2 is substituted by the oil tank 26, then we get an another mechanic system, which is driven by hydraulic. The electric circuit used in this example is still the same as shown in FIG. 5.

EXAMPLE 3

Figure 4:
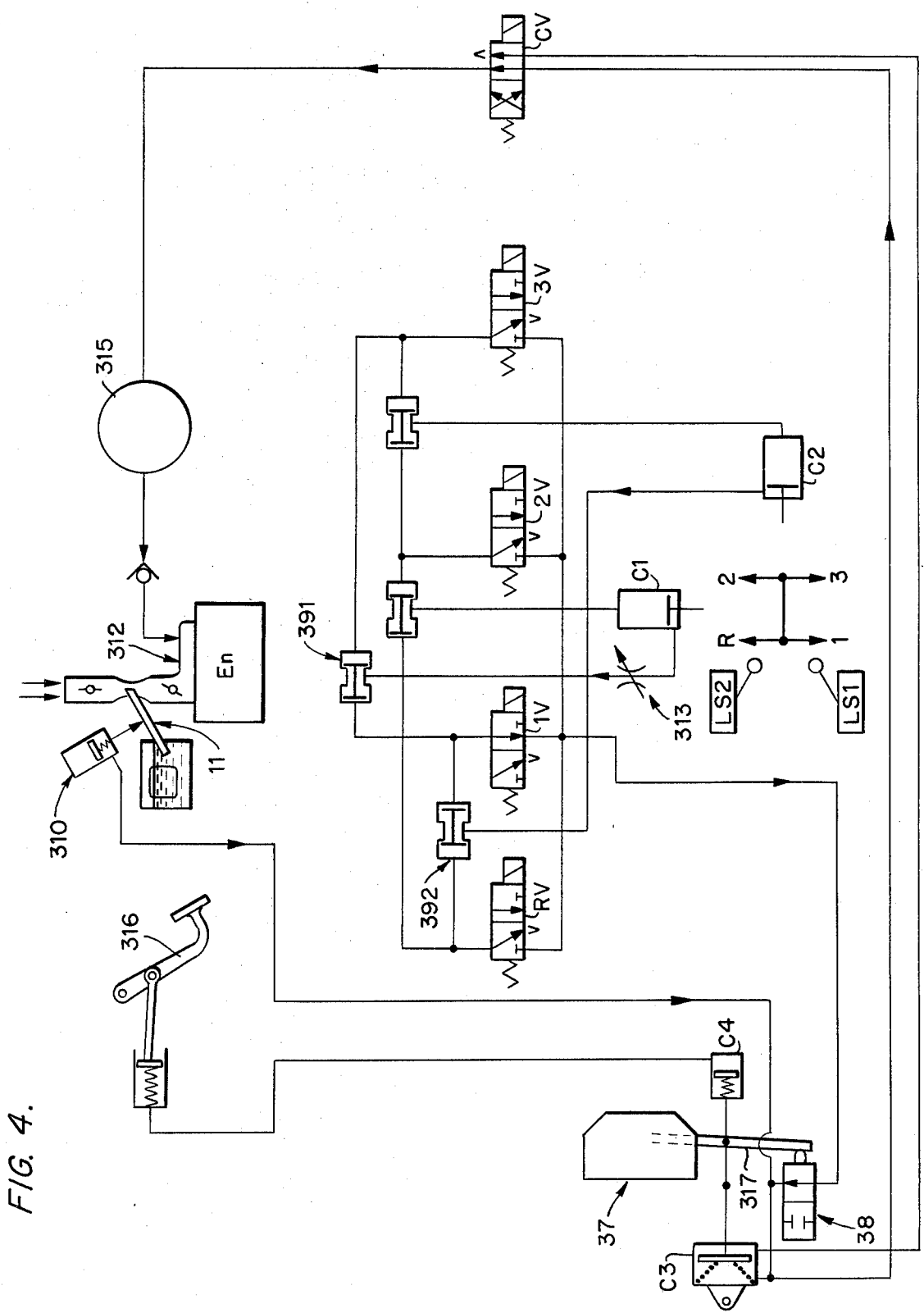
FIG. 4 is a practical embodiment of the vacuum mechanical system of the invention.

The invention also can be arranged as a vacuum mechanic system shown in FIG. 4. In this example, between the pedal of accelerator 316 and a throttle valve 311, there is an air cylinder 310, which will operate to shut smaller when the clutch is open. By this effect, the over speed of the engine can be avoided.

In FIG. 4, between the engine 312 and the common valve CV, there is a vacuum tank 35. The clutch lever will drive a vacuum driven hydraulic pump $C_3$ to operate. When the common valve CV works, the valve opened, the vacuum driven hydraulic pump $C_3$ is effected by the vacuum strength, the pressure of the air presses the oil pump, the oil then passes through shutter valves 391 and 392 and flowing into cylinder $C_4$, which then presses down the clutch lever 317, opens the clutch 37.

The electric circuit used in this vacuum mechanic system is also the same as shown in FIG. 5, the effect has shown above.

EXAMPLE 4

Figure 6:
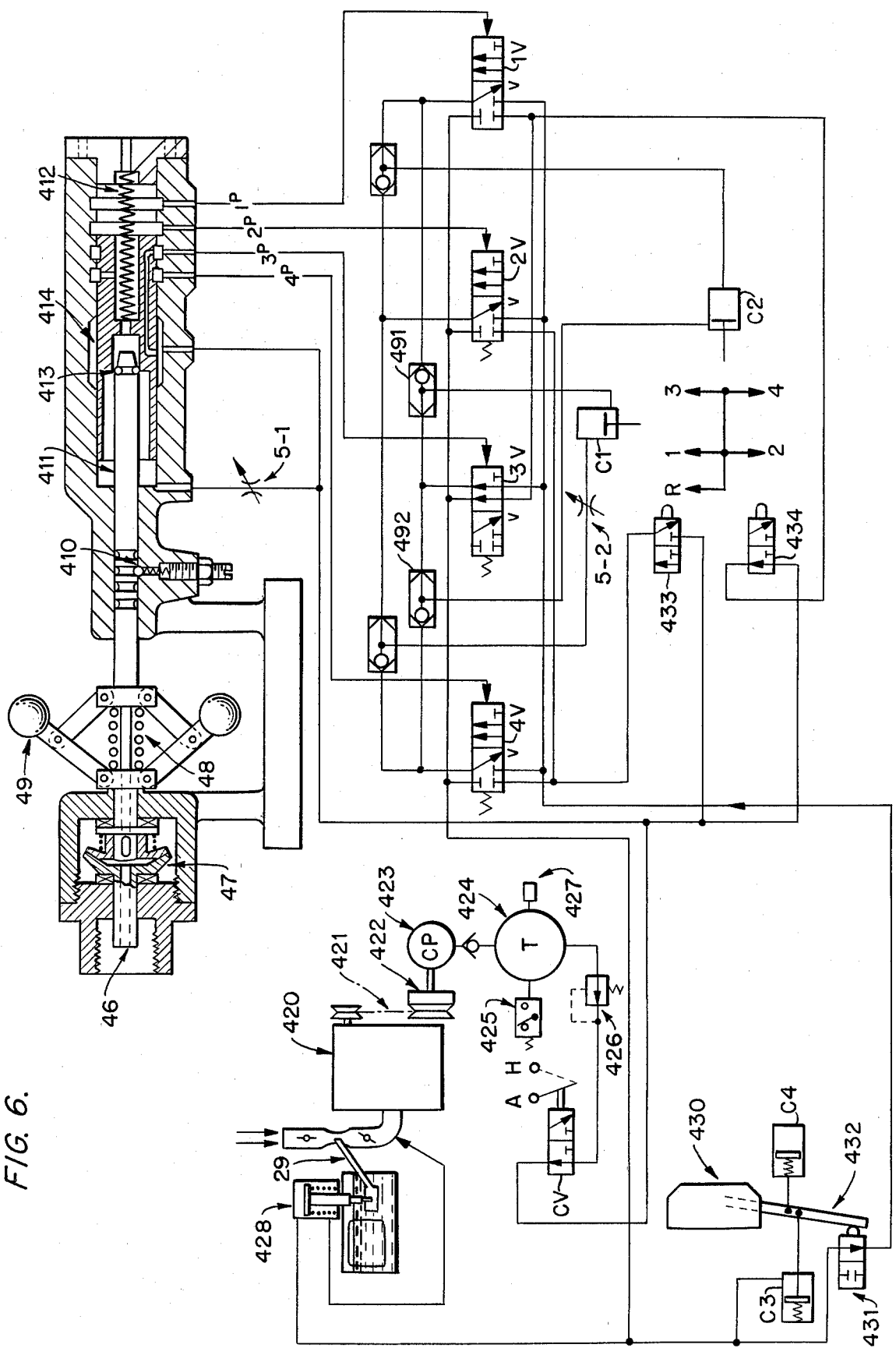
FIG. 6 is a practical embodiment of the air-controlled centrifugal mechanical system of the invention.

The gear shifting system of the invention can also be arranged as shown in FIG. 6, by using the centrifugal controller and compressed air, to drive the relay valve open of close, then finally, the clutch and gear shifting lever will operate automatically or can operated by hand.

This system comprises an air compressed apparatus and a control brain. The air compressed apparatus is the same as mentioned in Example 1. The control brain then is a centrifugal controller, which includes a linking turning axis 46, which is the linking axis of the flexible axis connected to the wheel. The linking turning axis is connected to a friction linkage 47. Outside the friction linkage 47, there is a pair of flying balls 49, between the frame of the flying balls, is a spring 48, the center of the flying balls is connected to a pilot pin 411. The pilot pin 411 can push the motive valve 414 moving. The turning speed of the output axis of the gear box can be transmitted to the turning axis 46 of the centrifugal controller, and to make the flying ball turn with the wheel of the car by means of friction linkage 47. If the speed of the car is faster, the centrifugal force of the flying ball becomes larger, the distance between the flying ball and the axis becomes larger too, the pilot pin 46 then moves toward left. If the turning speed is slow down, the centrifugal force of the flying ball becomes small and the spring 48 push the pilot pin 411 toward right, the motive valve then is moving with the pilot pin 411.

When the handle control valve CV is on the automatic side A, the compressed air then flows through control valve CV, and pass the mechanic valve 434, arrives at the relay valve 3V, the relay valve 3V is driven by the compressed air from the air pipe 3P of the control brain. When the relay valve 3V is opened, the compressed air will continue to flow the air cylinder $C_3$, and the air cylinder $C_3$ pulls the clutch 430 open, the clutch lever 432 presses the mechanic valve 431 opened, the compressed air then flows through the relay valve 3V, and passes the shutter valve 491, 492 to drive the air cylinder $C_1$, $C_2$ operate, that is, cylinder $C_1$ makes the gear shifting lever shake forward to position 1 and 3, cylinder $C_2$ makes the gear shifting lever shake toward right. Finally, the gear shifting lever shakes into position 3, which is equivalent to the speed of the car.

In FIG. 6, the vacuum piston 428 is used to decrease the oil consumption, when the clutch becomes opened.

In this example, to reverse the car, the clutch pedal must be pressed by the foot to open, then pull the gear shifting lever to position R by hand.

If the automatic operation part is out of order, the control valve CV must be operated to the hand driving side H. Then people can change the gear shifting lever to the position equivalent to the speed of the car by hand and foot.

EXAMPLE 5

Figure 7:
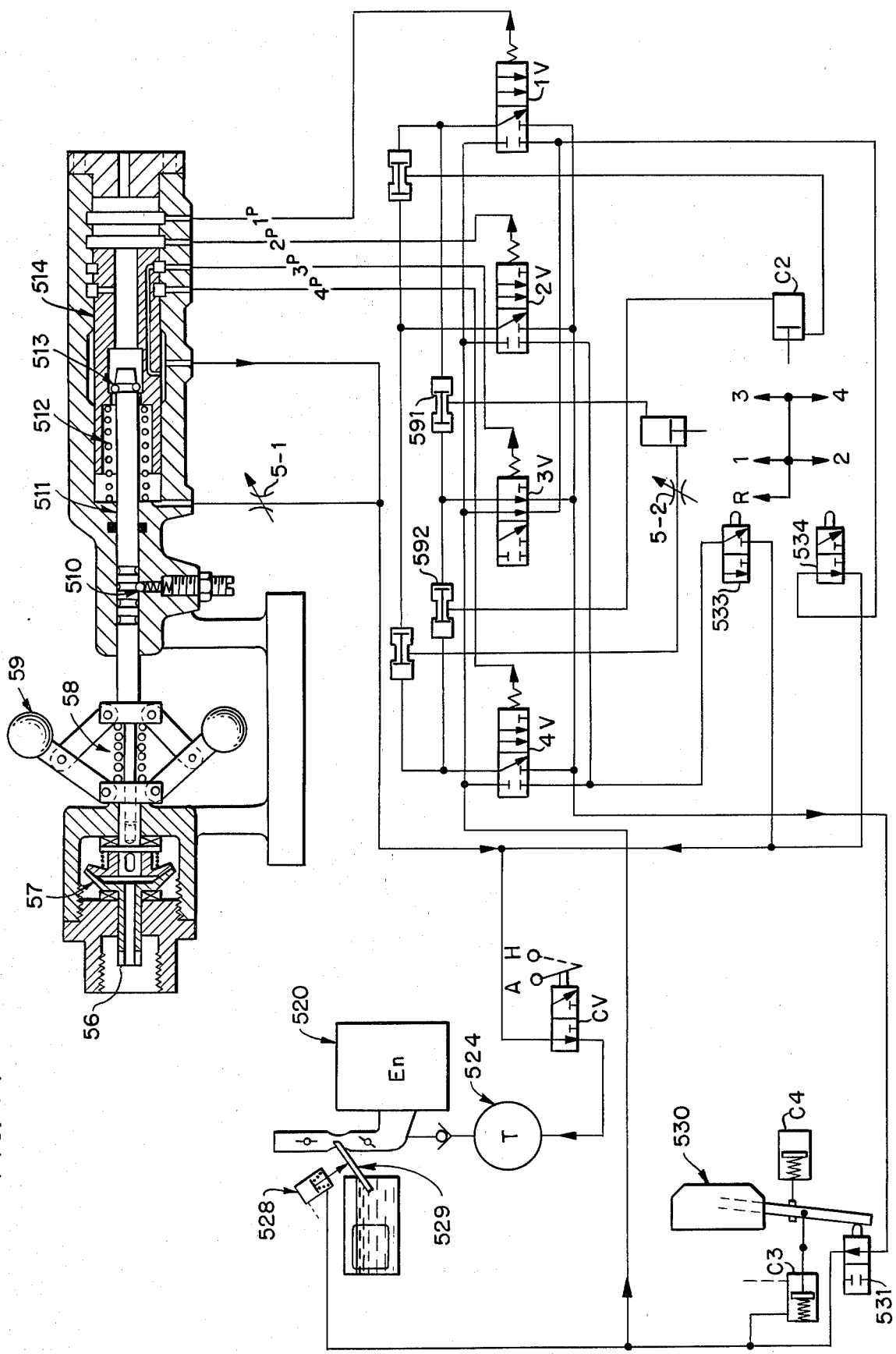
FIG. 7 is a practical embodiment of the vacuum-controlled centrifugal mechanical system of the invention.

With reference to FIG. 7, which is a vacuum control system. In this system, the engine 520 is connected directly to an air tank 524, the relay valves are substituted by vacuum relay valves.

EXAMPLE 6

Figure 8:
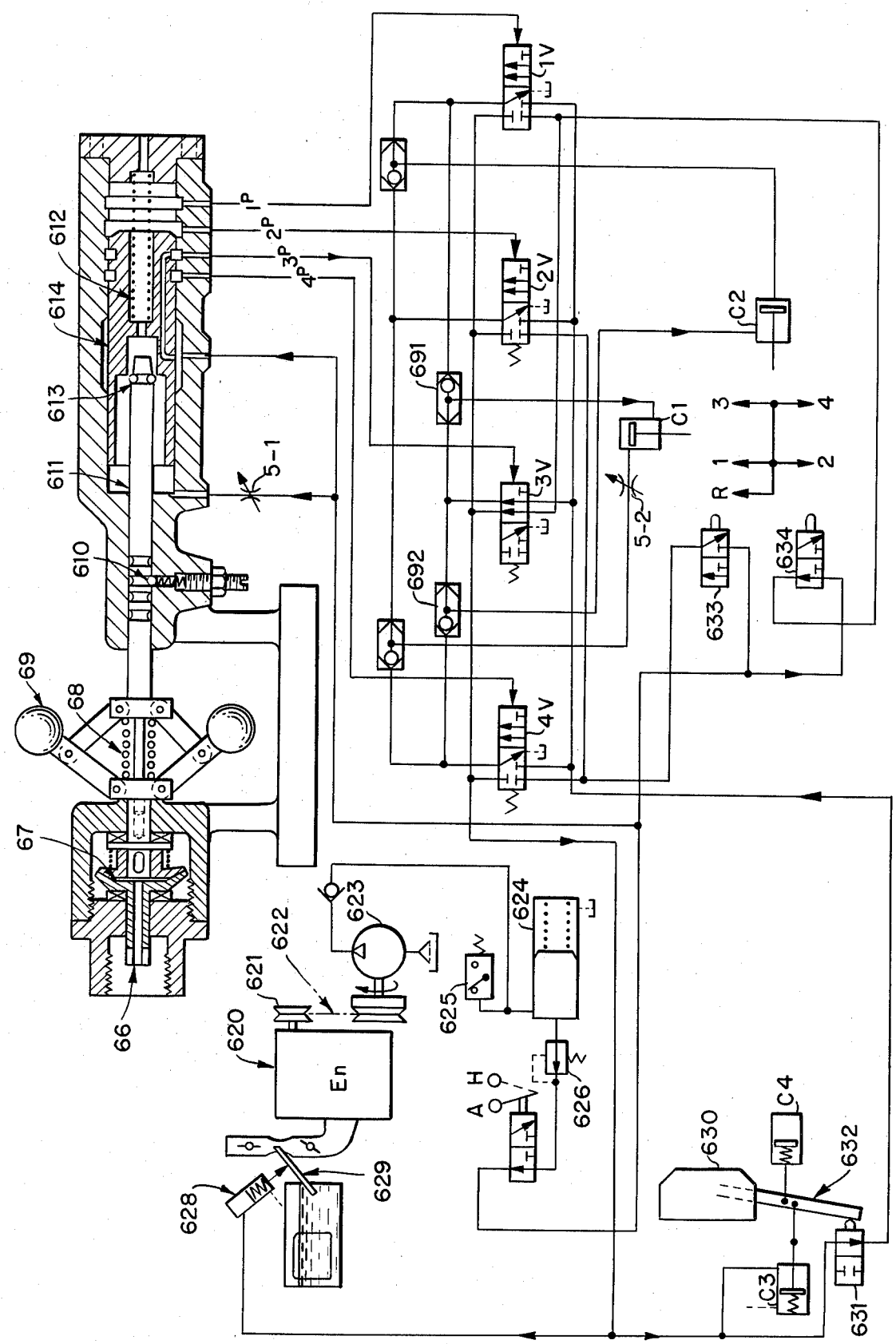
FIG. 8 is a practical embodiment of the hydrau-controlled centrifugal mechanical system of the invention.

The control system of FIG. 6 also can be changed to a centrifugal vacuum control system, which is shown as FIG. 8, the effect of this system is the same as mentioned in Example 4.

Figure 9:
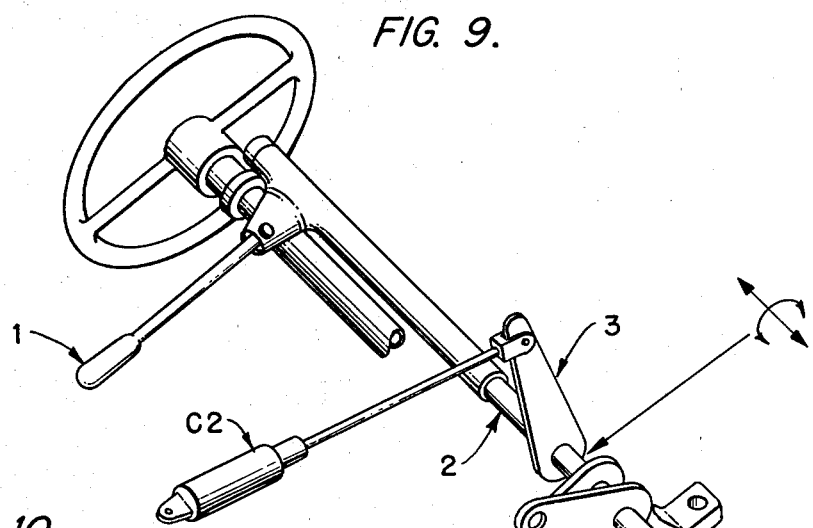
FIG. 9 is a practical embodiment of the structure of the cylinder which is put on to the floor type gear shifting lever of the invention.
Figure 10:
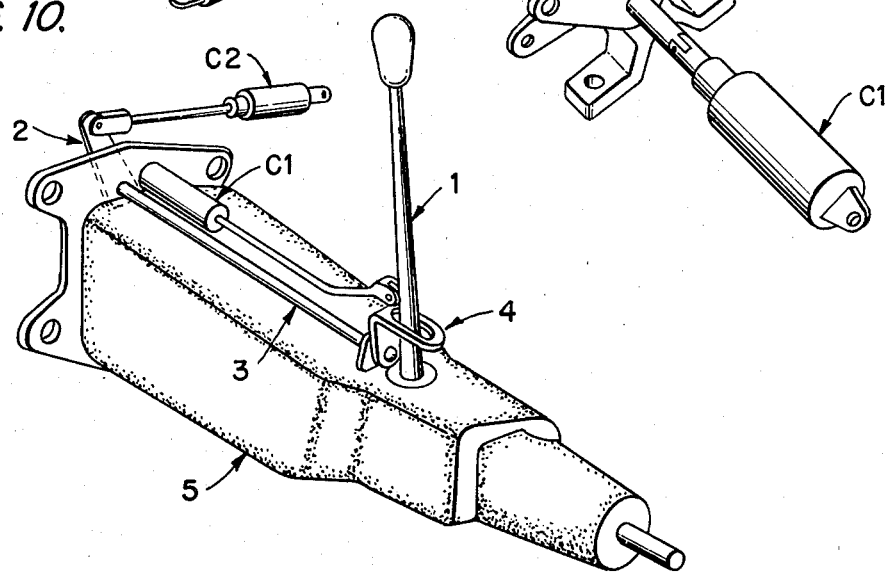
FIG. 10 is a practical embodiment of the structure of the cylinder which is used to drive the gear shifting lever on the steering wheel.

FIGS. 9 and 10 show a practical example of the structural interconnection between the gear shifting lever and driving cylinders $C_1$ and $C_2$. In these two Figures, we can clearly see that one of the cylinders $C_1$ will drive the gear shifting lever 1 by shaking it forward and backward, the other cylinder $C_2$ drives the gear shifting lever by shaking it rightward and leftward.

Any departure from the foregoing description which conforms to the present invention is intended to be included with in the scope of the claims:

I claim:

1. An automotive vehicle gear shifting system comprising:
   control brain means for providing a control signal indicative of a wheel speed of said vehicle;
   a power source;
   a common valve means responsive to said control signal for controlling a flow of power from said power source;
   clutch cylinder means for receiving power from said common valve for declutching a clutch of said vehicle;
   mechanical valve means for controlling, responsive to the position of said clutch, a flow of power from said common valve;
   control valve means for receiving power via said mechanical valve means and distributing it in accordance with said control signal from said control brain means;
   shutter valve means, coupled to said control valve means, for controlling a flow of power from said control valve;
   driving cylinder means, coupled to said shutter valve means, for operating a gear shifter of said vehicle;
   switch means, actuated by said gear shifter, for controlling said clutch cylinder for engaging said clutch, and
   means for limiting the engine speed of said vehicle during a gear changing operation.

2. A system according to claim 1 wherein said power source comprises a compressed air system.

3. A system according to claim 1 wherein said power source comprises a hydraulic system.

4. A system according to claim 1 wherein said power source comprises an oil pump.

5. A system according to claim 1 wherein said power source comprises a vacuum system.

6. A system according to claim 1 wherein said control brain means comprises a magnetic induction arrangement including a set of relays.

7. A system according to claim 1 wherein said control brain means comprises a centrifugal arrangement.

8. A system according to claim 7 wherein said centrifugal arrangement comprises a set of flying balls.

9. A system according to claim 1 wherein said control valve means comprises a set of control valves, one control valve for each gear to be shifted.

10. A system according to claim 9 wherein said shutter valve means comprises a set of shutter valves controlled by the distribution of power from said control valves.

11. A system according to claim 10 wherein said driving cylinder means comprises a first driving cylinder for moving said gear shifter in a first direction and a second driving cylinder for moving said gear shifter in a second direction different from said first direction.

12. A system according to claim 11 wherein said first and second directions are orthogonal.

13. A system according to claim 1 wherein said engine speed limiting means comprises means for limiting the fuel intake of a carburetor of said vehicle.

14. A system according to claim 1 wherein said driving cylinder means comprises a pneumatic cylinder.

15. A system according to claim 1 wherein said driving cylinder means comprises a hydraulic cylinder.

16. A system according to claim 1 wherein said engine speed limiting means comprises means for controlling a throttle of said vehicle.

* * * * *